(12) United States Patent
Arnoux

(10) Patent No.: US 7,370,201 B2
(45) Date of Patent: May 6, 2008

(54) SECURE IDENTIFICATION METHOD BETWEEN TWO RADIOFREQUENCY NETWORK APPLIANCES

(75) Inventor: Christophe Arnoux, Corbières (FR)

(73) Assignee: Gemplus, Gemenos (FR)

( * ) Notice: Subject to any disclaimer, the term of this patent is extended or adjusted under 35 U.S.C. 154(b) by 585 days.

(21) Appl. No.: 10/343,030

(22) PCT Filed: Jul. 19, 2001

(86) PCT No.: PCT/FR01/02353

§ 371 (c)(1), (2), (4) Date: May 27, 2003

(87) PCT Pub. No.: WO02/09345

PCT Pub. Date: Jan. 31, 2002

(65) Prior Publication Data

US 2003/0200434 A1    Oct. 23, 2003

(30) Foreign Application Priority Data

Jul. 26, 2000  (FR)  .................................. 00 09774

(51) Int. Cl.
*H04L 9/00* (2006.01)
*H04K 1/00* (2006.01)

(52) U.S. Cl. ................. 713/171; 380/270; 342/357.08; 455/456.1

(58) Field of Classification Search .................... 726/2, 726/27; 713/171
See application file for complete search history.

(56) References Cited

U.S. PATENT DOCUMENTS

| 5,581,598 | A | | 12/1996 | Hachiga |
| 6,094,487 | A | * | 7/2000 | Butler et al. ................. 380/270 |
| 6,157,826 | A | * | 12/2000 | Lee ............................ 455/411 |
| 6,163,843 | A | * | 12/2000 | Inoue et al. .................. 726/11 |
| 6,167,513 | A | * | 12/2000 | Inoue et al. ................. 713/150 |
| 6,199,161 | B1 | * | 3/2001 | Ahvenainen ................ 713/155 |

(Continued)

FOREIGN PATENT DOCUMENTS

GB    2 254 225 A    9/1992

OTHER PUBLICATIONS

Specification of the Bluetooth System: Core Dec. 1, 1999 pp. 20, 123-125 and 215-216 cited. Whole document relevent and found at: http://grouper.ieee.org/groups/802/15/Bluetooth/core_10_b.pdf.*

(Continued)

*Primary Examiner*—Christopher Revak
(74) *Attorney, Agent, or Firm*—Buchanan Ingersoll & Rooney PC

(57) ABSTRACT

In a radiofrequency network, such as a Bluetooth network, two devices are securely identified to one another for a communication session. One of the devices is designated as a master apparatus, and the other is a slave apparatus. An automatic identification process is carried out by placing the two devices in close proximity with one another, and transmitting very short range signals from the master apparatus, to be exclusively received by the slave apparatus. If the two devices are able to communicate over this short range, an identification key is generated and passed to the slave apparatus for subsequent exchanges in normal, larger range communications.

16 Claims, 2 Drawing Sheets

U.S. PATENT DOCUMENTS

| | | | |
|---|---|---|---|
| 6,326,926 B1* | 12/2001 | Shoobridge et al. | 343/702 |
| 6,334,059 B1* | 12/2001 | Stilp et al. | 455/402.2 |
| 6,463,290 B1* | 10/2002 | Stilp et al. | 455/456.1 |
| 6,493,550 B1* | 12/2002 | Raith | 455/422.1 |
| 6,496,928 B1* | 12/2002 | Deo et al. | 713/153 |
| 6,760,319 B1* | 7/2004 | Gerten et al. | 370/335 |
| 6,985,750 B1* | 1/2006 | Vicknair et al. | 455/519 |
| 7,158,756 B2* | 1/2007 | Palin et al. | 455/41.2 |
| 7,164,353 B2* | 1/2007 | Puleston et al. | 340/514 |
| 7,286,834 B2* | 10/2007 | Walter | 455/456.1 |
| 7,289,631 B2* | 10/2007 | Ishidoshiro | 380/270 |
| 7,295,556 B2* | 11/2007 | Roese et al. | 370/395.3 |
| 2003/0210787 A1* | 11/2003 | Billhartz et al. | 380/270 |
| 2006/0014547 A1* | 1/2006 | Walter | 455/456.1 |
| 2007/0201087 A1* | 8/2007 | Saito | 358/1.15 |

OTHER PUBLICATIONS

Specification of the Bluetooth System: Core Dec. 1, 1999 pp. 170-171 cited. Whole document relevent and found at: http://grouper.ieee.org/groups/802/15/Bluetooth/core_10_b.pdf.*

Specification of the Bluetooth System: Profile Dec. 1, 1999 pp. 68-71, 95, 13-60 cited. Whole document relevent and found at: http://grouper.ieee.org/groups/802/15/Bluetooth/profile_10_b.pdf.*

Perkins, "IP Mobility Support", Oct. 1996, Network Working Group Request for Comments: 2002, IBM, p. 1-79.*

"Specification of the Bluetooth System; Wireless Connections Made Easy; Profiles; v1.0B", Dec. 1999, pp. 1, 13-60, 190-218, XP002167007, Retrieved from the Internet: <URL:http://www.bluetooth.com/developer/specification/profiles_10_b.pdf>.

* cited by examiner

SECURE IDENTIFICATION METHOD BETWEEN TWO RADIOFREQUENCY NETWORK APPLIANCES

This disclosure is based upon French Application No. 00/09774, filed on Jul. 26, 2000 and International Application No. PCT/FR01/02353, filed Jul. 19, 2001, the contents of which are incorporated herein by reference.

BACKGROUND OF THE INVENTION

The invention relates to radiofrequency networks in which the network units communicate with one another by means of radiofrequency links and, more particularly, a method, in the networks, which permits two units in the network to recognise each other and to then communicate in a secure manner.

Making radiofrequency links between electronic units such as a personal computer, a printer, a mobile or fixed-line phone, etc., is known by making use of, for example, the specifications of a network known as "BLUETOOTH" which are defined in documents ETS 300-328 and ETS 300-339.

In such a BLUETOOTH network, the units each have an address by which they can be identified but this address is clearly transmitted in radiofrequency signals. The result is that the radiofrequency links are not secure.

To overcome this problem, it is proposed to enter an identical secret code in each of the two units to be connected and this will then permit session keys to be generated for authentication and encryption.

This process can prove to be tiresome, in that it is necessary to key in the code twice on a keyboard and the code may have numerous digits or letters.

Moreover, some network units, an earphone for a mobile phone, for example, might not have a keyboard, with the result that this code must be registered permanently, or almost permanently, in the unit with no keyboard. This leads to permission to access the network for anyone who picks up the unit, without having to identify themselves as a user.

It is also proposed to connect the two units with a cable link in order to exchange the session keys under maximum security, to ensure subsequent authentication and encryption. The inconvenient thing about this solution resides in the fact that each unit must be fitted with a special plug which will differ from one unit to another. An aim of the present invention, therefore, is to implement a process of recognition between two units in a radiofrequency network, a method which allows secure recognition of the two units to occur.

SUMMARY OF THE INVENTION

The invention, therefore, relates to a method of secure recognition between two units in a radiofrequency network, characterised in that it comprises the following steps, which consist in:
 (a) starting the two units,
 (b) selecting one of the two units as the master unit and the other as the slave unit,
 (c) moving the two units into immediate proximity to one another,
 (d) on the master unit, launching an automatic secure recognition process consisting in:
  (d1) transmitting signals according to a radiation pattern, in such a way that the signals are only picked up by the slave unit,
  (d2) launching a standard connection process to the radiofrequency network, and, in the case of successful connection to the radiofrequency network,
  (d3) generating a recognition key with the intention of making subsequent connections secure,
  (d4) re-transmitting signals according to the normal radiation pattern,
 (e) placing the two units at a distance from each other, for operation at a normal distance.

Steps (d1) and (d2) are repeated in the event of the failure of step (d2), connection to the radiofrequency network. Steps (d1) and (d2) are repeated at least once with a radiation diagram with a greater range. The increase in range is achieved by modifying the signal strength from the master unit, in particular. The invention also relates to a master unit to build the method according to the invention and which comprises a transmitter-receiver connected to a transmitting-receiving antenna, so as to implement a transmission-reception device, characterised by the transmission-reception device comprising means for modifying the range of the radiation pattern, so as to have an initial range corresponding to normal operation, and at least one second range smaller than the first one, to implement the method according to the invention.

BRIEF DESCRIPTION OF THE DRAWINGS

Other characteristics and advantages of the present invention will become apparent on reading the following description of a particular embodiment, the said description being given by reference to the attached drawings in which.

DETAILED DESCRIPTION

Figure 1:
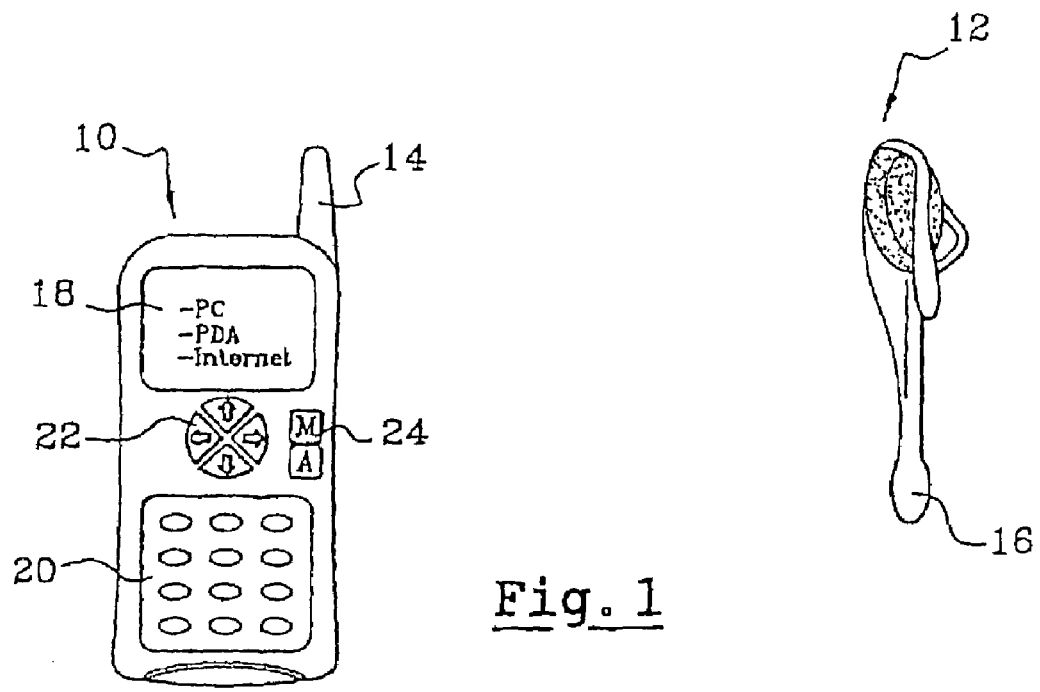
FIG. 1 shows two units in a radiofrequency network to be connected securely.

The invention will be described in the establishment of a radiofrequency connection between a mobile phone 10 and an earphone 12 (FIG. 1), this radiofrequency connection being realised according to the specifications of the BLUETOOTH system, referred to above.

The units in a BLUETOOTH network are each fitted with a radiofrequency antenna, indicated at 14 for the phone 10 and 16 for the earphone 12.

As the two units 10 and 12 are to be interconnected, the first step of the method, according to the invention, consists in:

(a) switching on the two units with a button (button 24) and 12. The effect of this switching-on will be to start up the transmitter-receiver of each unit and to activate some functions such as the display on a screen 18 and a keypad 20 of the phone 10.

This screen 18 will display, for example, a menu with several options, one of which will be called "RECOGNITION".

In the case of the two phones being equipped with a screen and a keypad, they will display the same menu. Then, in this case, the second step of the method consists in:

(b) selecting one of the two units as the master unit and the other as the slave unit. This selection does not exist in the case where only one of the two units has a display screen and a selection keypad, in which case it is the master unit.

As a result of this selection, the phone 10 acts as a master unit, whereas the earphone 12 acts as a slave unit.

When this selection has been made, the third step consists in:

(c) moving the two phones 10 and 12 closer together, so that their antennae 14 and 16 are in immediate proximity to one another.

At the end of this step, the phones do not yet transmit any radiofrequency signal.

The fourth step consists in:

(d) launching on the master unit, i.e., phone 10, an automatic secure recognition process by selecting the option "RECOGNITION" on the menu displayed on the screen 18, via the selection buttons 22.

Figure 2:
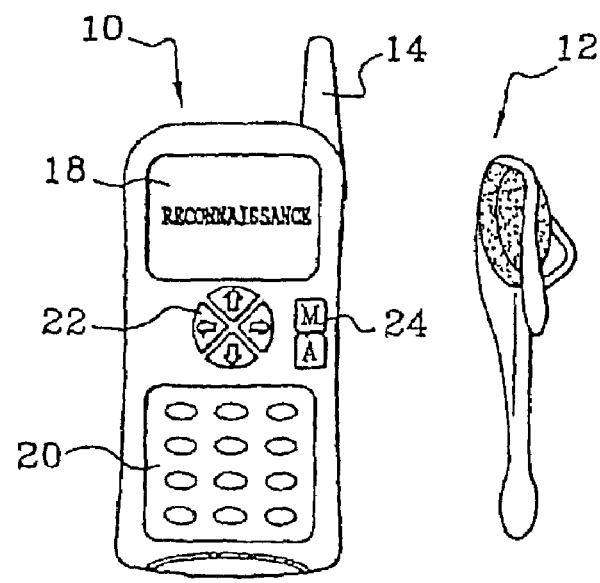
FIG. 2 shows the units from FIG. 1 in the process of secure recognition, according to the invention

The effect of this launching of the "RECOGNITION" process is to cause the standard process of connecting to the radiofrequency network to be implemented by the two units, but with one very important difference:

the master unit transmitter transmits radiofrequency signals according to a radiation pattern which has an extremely limited range, so as to be picked up only by another unit right next to it, such as the earphone 12 (FIG. 2).

As soon as the slave unit is integrated in the radiofrequency network by the standard network process, the master unit generates a recognition key which is then used to make subsequent exchanges of information secure, between the master unit and the slave unit.

When the recognition key is known to the two units, the method, according to the invention, terminates and this termination is displayed on the screen (18) by a suitable message. The master unit re-transmits, according to the normal radiation pattern, which corresponds to the normal range. The two units can then be placed at a distance from each other and continue to exchange information according to the standard network process, but those exchanges are secure, thanks to the recognition key.

If the method does not result in recognition, this fault is communicated to the user by a display or by any other means. The user may then recommence the method at step (b) without changing the master unit or by using the other unit as the master unit when it is possible to do so.

If several slave units are in operation within the zone covered by the radiation pattern, their presence will be detected by the master unit, which will then give a forceful message indicating this situation, for example, "Insecure environment: several units present".

In order to take account of the fact that the range of a radiation pattern depends on the power available from the batteries of the master unit, the method of the invention provides for several successive signal transmissions by the master unit at increasing power levels, in the case of the recognition process not ending with the lowest power level.

These transmissions at increasing power levels are stopped as soon as the recognition process has ended.

The implementation of the method according to the invention entails the master unit being modified to be able to transmit signals in accordance with at least two radiation patterns, one with a limited range for recognition and the other with a normal range for normal operation without recognition.

Figure 3:
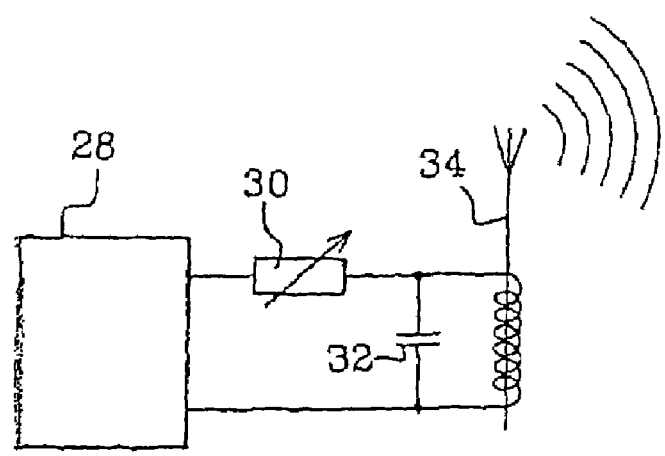
FIG. 3 is a simplified diagram of a master unit antenna with a modulated transmission power.
Figure 4:
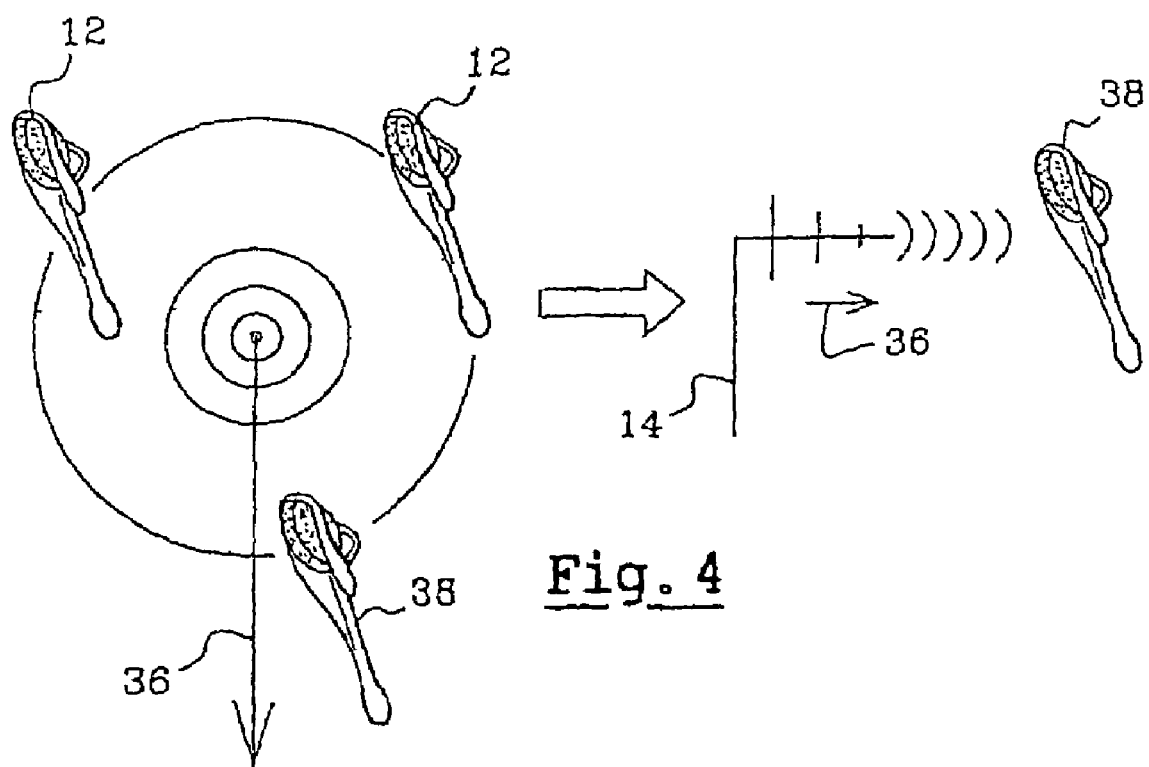
FIG. 4 is a diagram showing an antenna for a master unit, the directivity of which has a privileged direction of transmission.

This can be achieved by using two different antennae, one for recognition, according to the invention, and the other for normal operation. Just one antenna can also be used, with a power stage 28 providing power which is modulated, for example, by modifying its input impedance 30 (FIG. 3), so as to "detune" the oscillating antenna signal, consisting of the condenser 32 and the antenna proper 34.

The input impedance 30 is then modified, so as to tune the oscillating circuit progressively, and to attain the minimum power-level required for the signals transmitted by the master unit to be picked up by the slave unit.

The directivity of the antenna can also be modified, so as to favour a particular transmission angle corresponding to the arrow 36. Only the slave unit 38 which is set in this direction 36 will receive the transmitted signals.

When the secure link has been established between two units, according to the method of the invention, it can be interrupted, either voluntarily, by stopping one of the two units, or by exceeding the master unit radiation range.

In both cases, the secure link can only be reestablished by restarting the steps of the method at its beginning, which involves establishing the new link with another recognition key.

It will not, however, be necessary to repeat step (a), starting the unit, which has not been stopped, since a restart button has been provided to set the unit to step (b).

The invention claimed is:

1. A process for secure recognition between two units of a radiofrequency network, comprising the following steps:
   (a) switching on said two units,
   (b) selecting one of said two units as a master unit, and the other unit as a slave unit,
   (c) moving said two units into immediate proximity with one another,
   (d) launching on said master unit an automatic secure recognition process, as follows:
      (d1) transmitting signals, using a first radiation pattern of limited coverage, in such a way that the signals transmitted by the masterunit are only received by said slave unit,
      (d2) launching a standard connection process to said radiofrequency network and, in the case of successful connection to said radiofrequency network,
      (d3) generating a recognition key in one of said units for subsequent secure exchanges between said two units, and
      (d4) transmitting said recognition key from said one unit to the other of said units;
   (e) moving said two units at a distance from each other for operation at a distance larger than the immediate proximity; and
   (f) thereafter transmitting secure signals between said master unit and said slave unit, using said recognition key, by means of a second radiation pattern having a range of coverage larger than said first radiation pattern.

2. The process according to claim 1, wherein steps (d1) and (d2) are repeated in the event of failure to connect to the radiofrequency network at step (d2).

3. The process according to claim 2, wherein steps (d1) and (d2) are repeated at least once with a radiation pattern of greater range relative to the radiation pattern employed previously during steps (d1) and (d2).

4. The process according to claim 3, wherein the radiation pattern of greater range is obtained by increasing the power applied to an antenna of the master unit.

5. The process according to claim 3, wherein the radiation pattern of greater range is obtained by modifying the tuning of an antenna of the master unit.

6. The process according to claim 1, wherein the radiation pattern of an antenna of the master unit has a predetermined limited direction of radiation.

7. The process according to claim 1, wherein step (d3) is implemented by the slave unit.

8. The process according to claim 1, further including the step of reverting to step (b) and selecting the slave unit as the master unit, in the case of failure to connect to the radiofrequency network at step (d2).

9. A master unit comprising a transmitter-receiver connected to a transmission-reception antenna to form a transmission-reception device for use in a radiofrequency network to communicate with at least one slave unit within said radiofrequency network, wherein said master unit comprises means for modifying the range of the radiation pattern of the antenna, so as to have a first range and at least a second range smaller than said first range to establish a connection between said master unit and only said at least one slave unit within said radiofrequency network, when said at least one slave unit is in the immediate proximity of said master unit, wherein said master unit operates in a first mode to transmit a recognition key to said slave unit while utilizing said second, smaller range of the radiation pattern, and in a second mode to thereafter securely communicate with said slave unit using said recognition key, while utilizing said first radiation pattern for transmissions to said slave unit.

10. The master unit according to claim 9, wherein said means for modifying the range of the radiation pattern of the antenna comprises means to modify the power applied to said antenna.

11. The master unit according to claim 9, wherein said means for modifying the range of the radiation pattern of the antenna comprises means to modify the tuning of the antenna circuit.

12. The master unit according to claim 9, wherein said transmission-reception antenna has a predetermined limited direction of transmission.

13. A radiofrequency network communication device, comprising:

means for transmitting an initial signal within a first, limited range to establish a connection with a unit in the immediate proximity of said device;

means for generating a recognition key and providing said recognition key to a unit with which a connection has been established; and means for switching the transmission range of said transmitting means from said first, limited range to a second, larger range after said recognition key has been provided to the unit, for communicating with said unit using said recognition key.

14. The communication device of claim 13, wherein said switching means varies the power of said transmitting means, so that said transmitting means transmits said initial signal at a lower power than the power with which said communicating means transmits signals.

15. The communication device of claim 14, wherein said switching means carries said transmitting means to repeatedly transmit said initial signal at successively greater power levels until a connection is established.

16. The communication device of claim 13, wherein said transmitting means transmits said initial signal within a limited direction of radiation.

* * * * *